(12) United States Patent
Pathalil et al.

(10) Patent No.: US 12,479,452 B2
(45) Date of Patent: Nov. 25, 2025

(54) USER-ASSISTED DRIVE-ABLE AREA DETECTION

(71) Applicant: Continental Autonomous Mobility US, LLC, Auburn Hills, MI (US)

(72) Inventors: Nithin Joseph Pathalil, Lake Orion, MI (US); Nizar Ahamed, Farmington Hills, MI (US); Pedro A Patlan Rosales, Queretaro (MX)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 98 days.

(21) Appl. No.: 17/739,523

(22) Filed: May 9, 2022

(65) Prior Publication Data
US 2023/0356737 A1 Nov. 9, 2023

(51) Int. Cl.
*B60K 35/10* (2024.01)
*B60K 35/22* (2024.01)
*B60K 35/28* (2024.01)
*B60K 35/50* (2024.01)
*B60K 35/60* (2024.01)
(Continued)

(52) U.S. Cl.
CPC .............. *B60W 50/14* (2013.01); *B60K 35/10* (2024.01); *B60K 35/22* (2024.01); *B60K 35/50* (2024.01); *B60K 35/60* (2024.01); *B60K 35/80* (2024.01); *B60R 1/22* (2022.01); *B60W 40/06* (2013.01); *B60W 60/001* (2020.02); *B60R 2300/10* (2013.01); *B60R 2300/20* (2013.01); *B60W 2050/146* (2013.01); *B60W 2420/403* (2013.01)

(58) Field of Classification Search
CPC ........ B60K 2360/143; B60K 2360/166; B60K 2360/176; B60K 2360/179; B60K 35/10; B60K 35/28; B60K 35/00; B60R 1/22; B60R 2300/10; B60R 2300/20; B60W 50/14; B60W 40/06; B60W 60/001; B60W 2050/146; B60W 2420/403; G06V 10/235; G06V 10/945; G06V 20/56
USPC ........................................................... 701/28
See application file for complete search history.

(56) References Cited

U.S. PATENT DOCUMENTS

| 7,043,346 | B2 | 5/2006 | Kubota et al. |
| 7,519,922 | B2 | 4/2009 | Obradovich |

(Continued)

FOREIGN PATENT DOCUMENTS

| DE | 102017104428 A1 | 9/2018 |
| DE | 102017115810 A1 * | 1/2019 |

(Continued)

OTHER PUBLICATIONS

International Search Report dated Oct. 2, 2023 of International Application PCT/US2023/066715 on which this application is based.

*Primary Examiner* — Rachid Bendidi
*Assistant Examiner* — Hossam M Abd El Latif

(57) ABSTRACT

A user assisted method and vehicle control system provides for identifying a drivable area for autonomous vehicle operation. The system provides for displaying an area including a potential drivable area on a display device disposed within a vehicle, a means for identifying a drivable area by a vehicle operator and for storing information indicative of a drivable area indicated by the vehicle operator in a vehicle control system. The vehicle control system utilizes the identified drivable area for generating a vehicle path with the vehicle control system.

17 Claims, 6 Drawing Sheets

(51) Int. Cl.

| | | |
|---|---|---|
| *B60K 35/80* | (2024.01) | |
| *B60R 1/22* | (2022.01) | |
| *B60W 40/06* | (2012.01) | |
| *B60W 50/14* | (2020.01) | |
| *B60W 60/00* | (2020.01) | |
| *G06V 10/22* | (2022.01) | |
| *G06V 10/94* | (2022.01) | |
| *G06V 20/56* | (2022.01) | |

(56) References Cited

U.S. PATENT DOCUMENTS

| | | | |
|---|---|---|---|
| 2020/0180691 A1 | 6/2020 | Sandblom et al. | |
| 2021/0048529 A1* | 2/2021 | Roy Chowdhury | ......................... B60W 40/068 |
| 2022/0090937 A1* | 3/2022 | Lazaridis | ........... G01C 21/3826 |
| 2022/0187837 A1* | 6/2022 | Tebbens | .............. G06F 16/2246 |
| 2022/0314991 A1* | 10/2022 | Naruse | .................. B60W 20/40 |
| 2022/0355815 A1* | 11/2022 | Bill-Clark | ............ G06V 40/103 |
| 2023/0271556 A1* | 8/2023 | Kobashi | .................... B60R 1/27 348/142 |
| 2023/0311934 A1* | 10/2023 | Ratnoo | ............... B60W 60/001 701/23 |
| 2024/0075921 A1* | 3/2024 | Paula | ................... B60W 30/06 |

FOREIGN PATENT DOCUMENTS

| | | |
|---|---|---|
| DE | 102018125266 B3 | 11/2019 |
| EP | 3651138 A1 | 5/2020 |

\* cited by examiner

USER-ASSISTED DRIVE-ABLE AREA DETECTION

TECHNICAL FIELD

The present disclosure relates to a method and system for teaching an autonomous vehicle control system.

BACKGROUND

Automated driving and driver assist systems gather information about an environment surrounding a vehicle and use that information to plan and move along a desired path. Gathering information about the surrounding environment may require significant processing resources to adapt to many different and varying environments. Moreover, significant variations between different environments can inhibit practical application of autonomous vehicle operations.

Automotive manufactures are continuously seeking more efficient information processing methods to improve operation of vehicle systems.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A user assisted method of identifying a drivable area for autonomous and/or semi-autonomous vehicle operation according to one disclosed example embodiment includes, among other possible things, displaying an area including a potential drivable area on a display device disposed within a vehicle or outside the vehicle (like a mobile phone), providing a means for identifying a drivable area by a vehicle operator, generating and storing information indicative of a drivable area indicated by the vehicle operator for use by a vehicle control system..

In another example embodiment of the foregoing method, the display device is configured to display an outline of the drivable area identified by the vehicle operator.

In another example embodiment of any of the foregoing methods, the display device is configured to generate the outline responsive to the vehicle operator tracing the drivable area on the display device.

Another example embodiment of any of the foregoing methods includes selecting an area displayed on the display device and defining a surface characteristic of the selected area as corresponding with a surface that is drivable.

In another example embodiment of any of the foregoing methods, the surface characteristic comprises one of a surface texture or a surface color.

Another example embodiment of any of the foregoing methods includes detecting areas within the displayed area having the defined surface characteristic and identifying the drivable area to include the detected areas.

Another example embodiment of any of the foregoing methods includes storing the surface characteristic as an identified drivable surface.

Another example embodiment of any of the foregoing methods includes defining the drivable area as all area including at least one of the stored surface characteristics.

In another example embodiment of any of the foregoing methods, selecting the area comprises recording surface characteristics for an area responsive to a selected area disposed within a closed shape on the display device.

Another example embodiment of any of the foregoing methods includes dynamically identifying drivable areas during vehicle operation based on at least one of the stored surface characteristics.

In another example embodiment of any of the foregoing methods, displaying the area comprises displaying an area from an image captured by a vehicle camera.

In another example embodiment of any of the foregoing methods, displaying the area comprises displaying a top-view of an area corresponding to a location of the vehicle.

A vehicle control system according to another example disclosed embodiment includes, among other possible things, a display device configured to display an image of an area proximate the vehicle including a potential drivable area and a controller configured to identify a drivable area with user assistance for use during autonomous vehicle operation by identifying a drivable area responsive to a vehicle operator selecting an area shown on the display device and storing information indicative of a drivable area indicated by the vehicle operator.

In another embodiment of the forgoing vehicle control system, the display device is configured to provide for tracing of an outline of the drivable area on the display device by the vehicle operator.

In another embodiment of any of the forgoing vehicle control systems, the display device is configured to provide for selection of a surface characteristic by the vehicle operator that corresponds to a surface that is drivable.

In another embodiment of any of the forgoing vehicle control systems, the controller if further configured to detect areas within the displayed area having the defined surface characteristic and identifying the drivable area to include the detected areas.

In another embodiment of any of the forgoing vehicle control systems, the controller if further configured to store the surface characteristic as an identified drivable surface and to defining the drivable area as all areas including at least one of the stored surface characteristics.

In another embodiment of any of the forgoing vehicle control systems, the display device is configured to display the area proximate the vehicle from an image captured by a vehicle camera or from a top-down view of an area corresponding to a location of the vehicle.

A non-transitory computer readable storage medium including instructions for operating a vehicle control system according to another disclosed example embodiment includes, among other possible things, instructions prompting a display device to display an image of an area including a potential drivable area, instructions prompting a controller within the vehicle to provide a means for identifying a drivable area by a vehicle operator, and instructions prompting a controller to generate and store information indicative of a drivable area indicated by the vehicle operator for use by a vehicle control system Another embodiment of the forgoing non-transitory computer readable storage medium includes instructions prompting the controller to identify the drivable area in response to an outline traced by a vehicle operator on the display device or based on a surface characteristic selected by the vehicle operator.

Although the different examples have the specific components shown in the illustrations, embodiments of this disclosure are not limited to those particular combinations.

It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
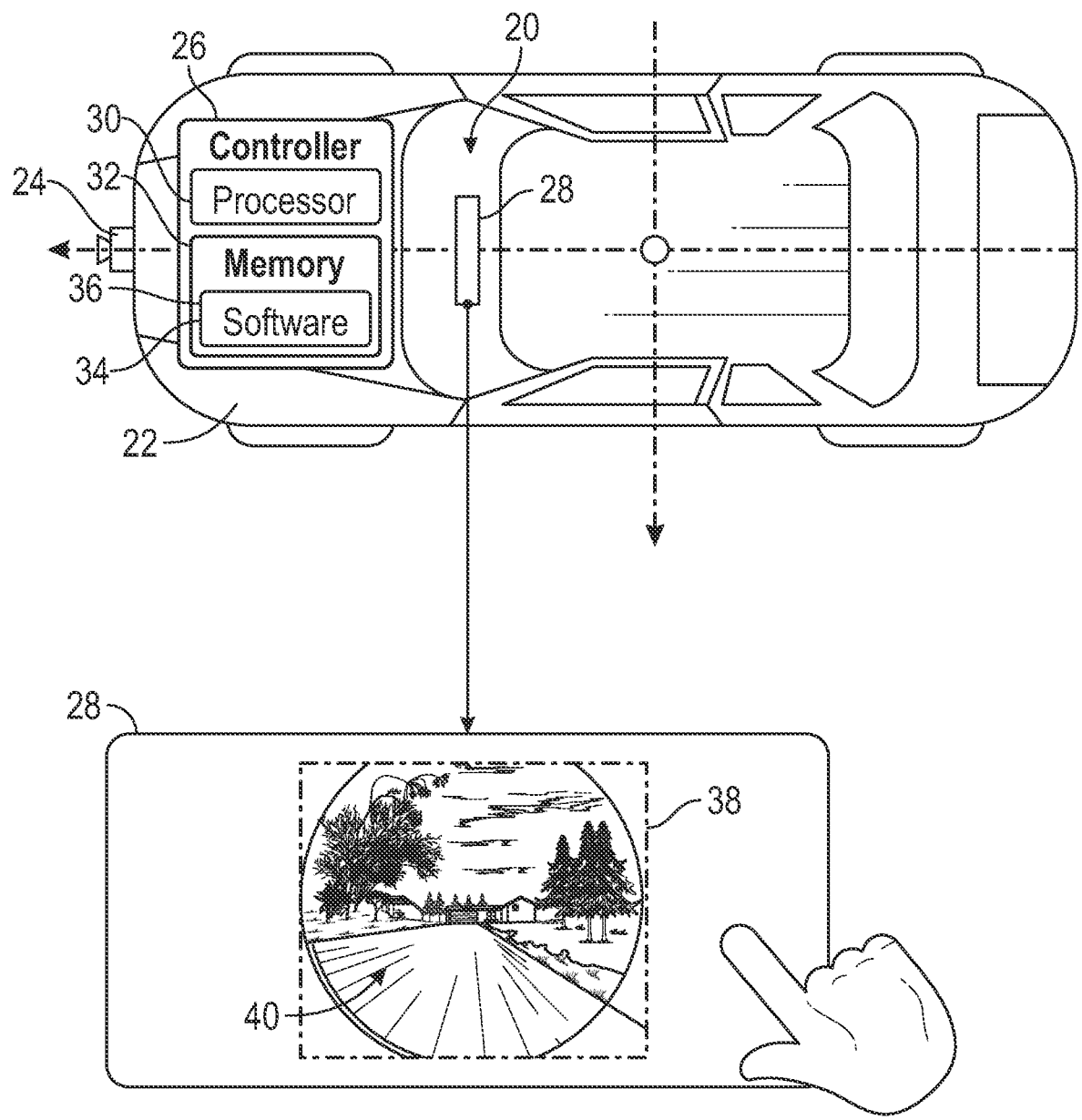
FIG. 1 is a schematic view of a vehicle including a user-assisted system for identifying a drivable areas.

Referring to FIG. 1, a vehicle 22 is schematically shown that includes a user-assisted system 20 for identifying drivable areas. The example vehicle 22 is operable in an autonomous or semi-autonomous manner and therefor requires information indicating what areas are drivable for generation of a vehicle path. In some systems, a complex, processor intensive process is required to automatically detect and identify drivable areas around a vehicle. A disclosed example system 20 and method provides for user-assistance to define the drivable area and thereby reduce complexity and processor load.

In one example disclosed system embodiment, a display 28 disposed within the vehicle 22 accepts input from a user to identify and define drivable areas. The display 28 is in communication with a controller 26 and the method and system 20 are embodied in software instructions 34 stored in a memory device 32 and performed by a processor 30. Moreover, although the example display 28 is part of the vehicle 22, any display from a mobile phone or other mobile computing device that may communicate with the vehicle controller 26 through known communications protocols could be utilized and is within the scope and contemplation of this disclosure.

The example controller 26 may be a separate controller dedicated to the control system 20 are may be part of an overall vehicle controller. Accordingly, the example controller 26 relates to a device and system for performing necessary computing or calculation operations of the control system 20. The controller 26 may be specially constructed for operation of the control system 20, or it may comprise at least a general-purpose computer selectively activated or reconfigured by the software instructions 34 stored in the memory device 32. The computing system can also consist of a network of (different) processors.

The example vehicle controller 26 includes the processor 30 and the memory device 32. The memory device 32 provides for the storage of the software instructions 34 that prompt operation of the processor 30 and system 20. The software instructions 34 may be embodied in a computer program that uses data stored in the memory device 32 that may be required for its execution.

The instructions 34 for configuring and operating the controller 26, control system 20 and the processor 30 are embodied in software instructions that may be stored on a computer readable medium, schematically shown at 36. The computer readable medium 36 may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the disclosed memory device 32, may can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 34 in the memory device 32 may include one or more separate programs, each of which includes an ordered listing of executable instructions for implementing logical functions. The disclosed controller 26 is configured to execute the software instructions 34 stored within the memory device 32, to communicate data to and from the memory device 32, and to generally control operations pursuant to the software. Software in memory, in whole or in part, is read by the processor 30, perhaps buffered within the processor, and then executed.

The vehicle 22 includes a camera 24 that produces images 38 of an area surrounding the vehicle 22. The camera 24 may be any one or group of cameras provided on the vehicle 22. The area around the vehicle may include a drivable area 40. In the disclosed example image 38, the drivable surface is a driveway leading to a garage. On either side of the driveway are lawn and grass that are not drivable for purposes of creating a desired path to and/or into the garage.

Instead of generating complex systems that may require volumes of data input, the example system 20 provides for user-assistance to aid in the determination of drivable areas.

Figure 2:
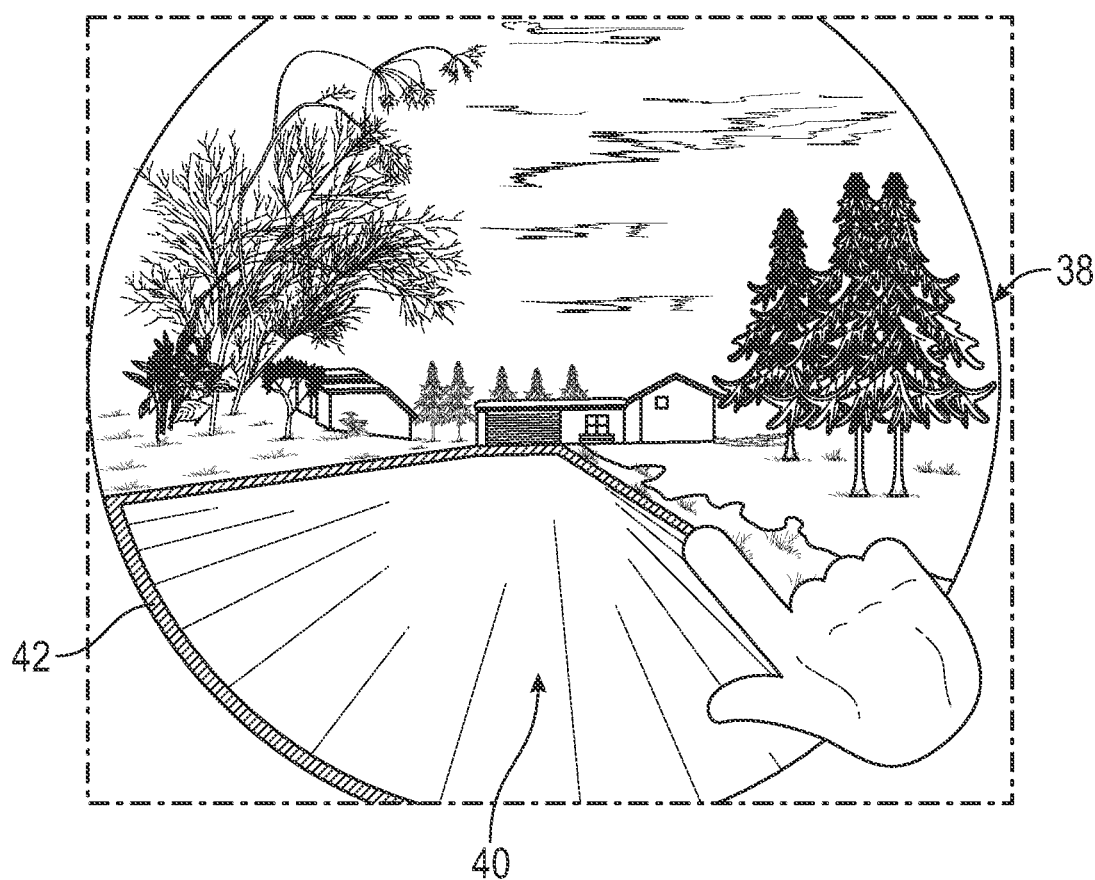
FIG. 2 is an example image according to an example system embodiment.
Figure 3:
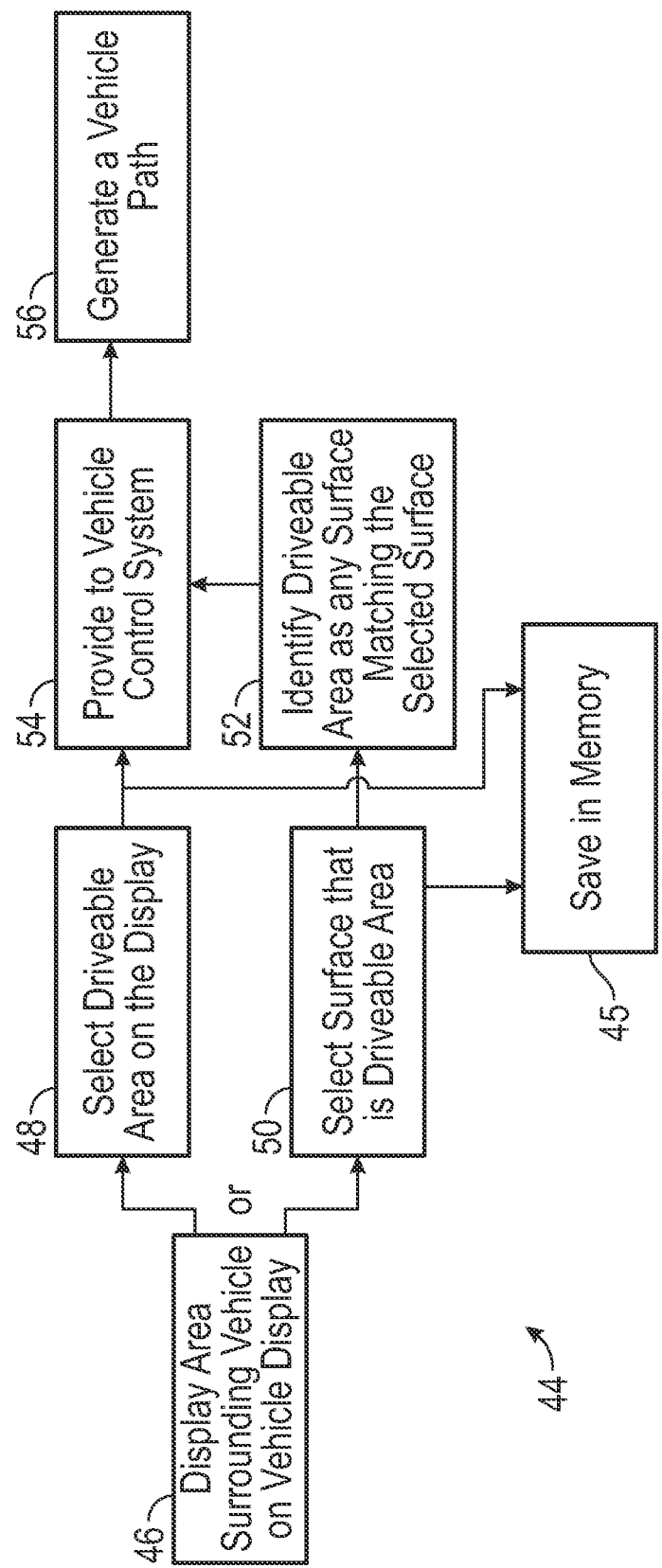
FIG. 3 is a flow diagram of an example process for identifying drivable areas according to an example system embodiment.

Referring to FIGS. 2 and 3 with continued reference to FIG. 1, in one example system embodiment, an image 38 is displayed on the display 28 for viewing by a vehicle operator as indicated at 46 in process chart 44. The example display 28 may be a touch sensitive display that accepts input by direct touching of the display over the displayed image 38. The display may also include other input devices such as buttons and other user operated controls that enable user selection of areas on the image 38.

In this example, a user may touch and trace an outline 42 directly onto the image 38 as is shown in FIG. 2. The outline 42 encloses an area 40 on the image that is thereby identified as a drivable area. The outline 42 provides a direct selection of the drivable area 40 as schematically indicated at 48. The area 40 is saved in memory for any upcoming maneuvers and the sample texture as indicated at 45.

Figure 4:
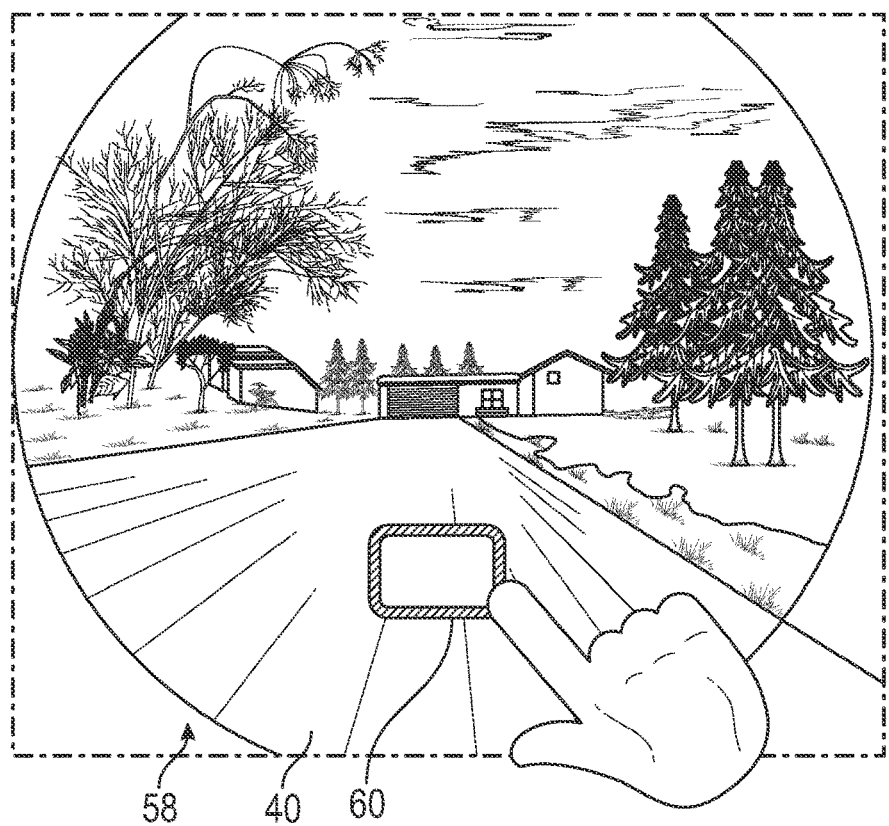
FIG. 4 is another example image according to an example system embodiment.

Referring to FIG. 4 with continued reference to FIG. 3, another example system embodiment provides for the selection of a small area with a repetitive pattern and a specific surface characteristic as indicated at 50 and shown in image 58. In this example, the user selects a small area that exemplifies the surface of the drivable area 40. In this example, a box 60 is moved on the image by a user over the surface that is drivable. In this example, the box 60 is placed on the driveway. The driveway is formed from asphalt and therefore has a specific visible texture and color. The system 20 stores the selected surface characteristic in the memory for use in determining the entire drivable area.

Once the surface characteristic is identified, the system 20 will find all the areas in the image 58 with the same surface characteristic as indicated at 52. In this example, the user is only required to identify the surface that is indicative of a drivable area 40. The system 20 uses the identified information to detect and define all the drivable areas 40 show in the image 58.

The images 38 and 58 are provided by the camera 24 mounted to the vehicle 22. The camera 24 may be a single camera or multiple cameras mounted at different points on the vehicle.

Figure 5:
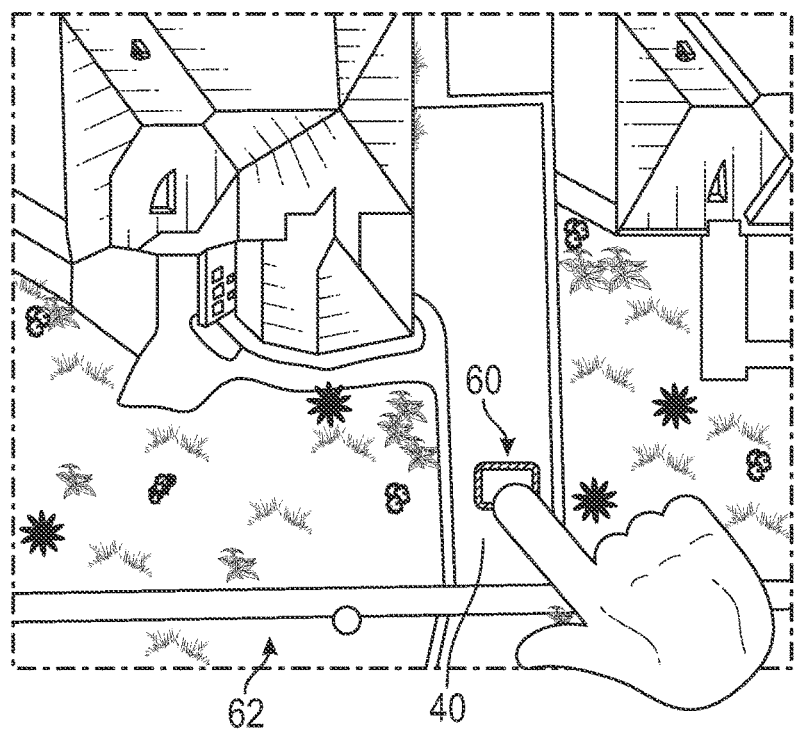
FIG. 5 is yet another example image according to an example system embodiment.

Referring to FIG. 5, with continued reference to FIGS. 1 and 3, an overhead image 62 is provided on the display 28 for use by a user. The image 62 of an area proximate the vehicle 22 or may be an area selected by the user independent of a location of the vehicle. The image 62 may be obtained from satellite imagery and/or may be generated based on other views around the vehicle. A user may select the drivable area 40 by placing the box 60 as shown on some portion of the drivable area 40. It should be appreciated, that although a box 60 is shown by way of example for identifying the drivable area 40 other shapes and pointer conventions may be utilized to indicate the drivable area identified by the user.

In the example image 62, the drivable area 40 is concrete and therefore has a surface texture and color that is different than the previous example shown with regard to image 58 shown in FIG. 4. The system 20 saves the various different surface characteristics for future use in determining drivable area.

Once the user has identified the drivable area 40, that information is provided to a vehicle control system as is indicated at 54. The vehicle control system then uses the information regarding drivable surface area 40 to generate a vehicle path as indicated at 56. The path generated by the vehicle control system 20 may utilized many different methods and processes that are all within the contemplation and scope of this disclosure.

Figure 6:
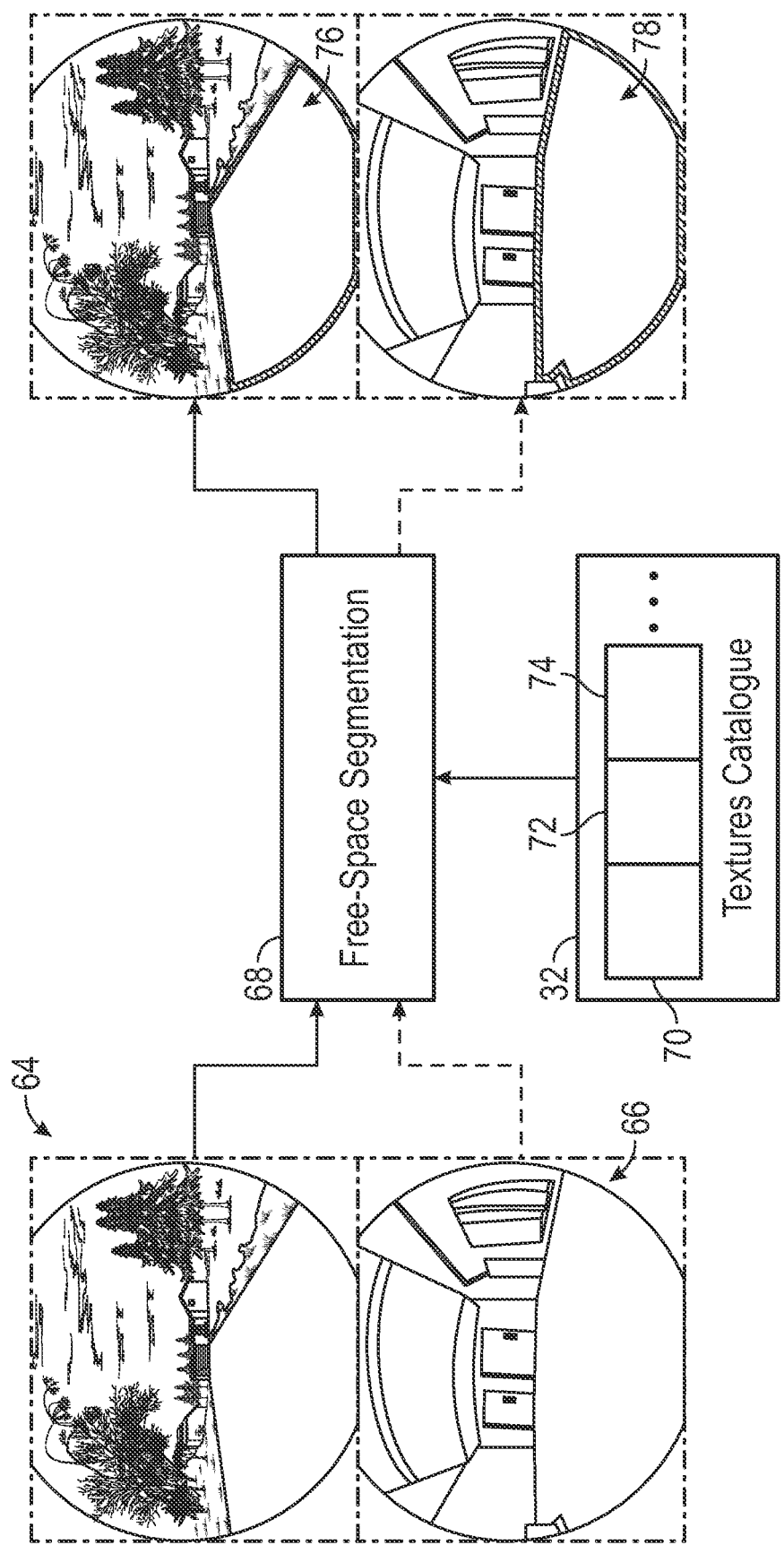
FIG. 6 is a flow diagram of another example process for identifying drivable areas according to another example embodiment.

Referring to FIG. 6, in another example embodiment, the system 20 includes a plurality of saved and selectable surface characteristics that either have been previously identified as drivable surfaces or are provided as default examples in the memory device 32. In this disclosed example, the surface characteristics are different surface textures 70, 72 and 74. The surface textures 70, 72 and 74 may be user identified and/or may be predefined. If the surface textures 70, 72, and 74 are predefined, a user may simply select one of the surface textures from a menu provided on the display 28 rather than select the surface on a specific image. In one disclosed embodiment, the user selects the surface texture 70, 72 and 74 that corresponds to the drivable surface present in an image 64, 66 and a segmentation module 68 will define the drivable area that corresponds with that image. In this example, the drivable areas are indicated at 76 and 78 in respective images. The segmentation module 68 searches the images 64, 66 for surfaces that match the selected one of the textures 70, 72 and 74. Once found, the segmentation module 68 defines those areas as drivable.

Figure 7:
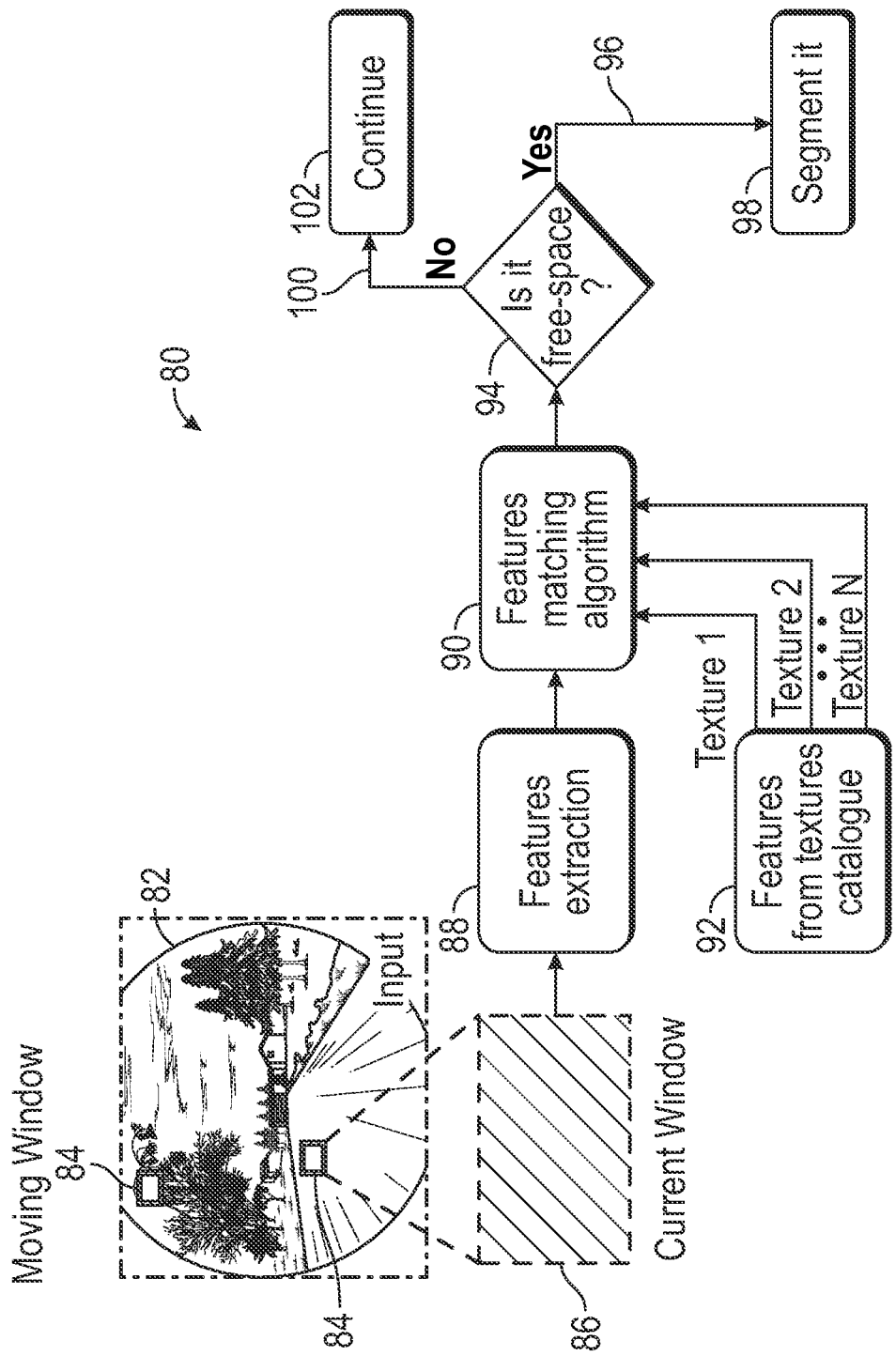
FIG. 7 is another flow diagram of an example process for identifying drivable areas.

Referring to FIG. 7, process steps for the example system is indicated at 80 and includes a moveable window 84 which traverses the whole image as part of the segmentation process 68 in FIG. 6 . . . . In this process, an image 82 is segmented and the window 84 indicates sample positions of the moving window during the segmentation of image 82 resulting in a segmented part of the image that corresponds with a drivable area. Characteristics of the segmented portion of the image 82 within the window 84 are identified as a drivable surface and provided to a feature extraction module 88. The feature extraction module 88 identifies features of the image 86, such as for example color and/or texture and provides those features to the matching algorithm 90. The matching algorithm 90 matches the features identified from the window 86 with saved features indicated at 92. The saved features may be any identifying feature that provides for differentiation between drivable and non-drivable surfaces. In one disclosed embodiment, surface texture is used as the identifying feature. Once the features are matched at 90, a further determination is made by the system as indicated at 94 of whether the surface identified is free space as indicated at 94. If objects are disposed on the identified surface than the space is not fee as indicated a 100 and the system moves to finding other free space as indicated at 102.

When free space is found as indicated at 96, the system 20 segments the space as indicated at 98. Segmented space 98 is that space that is identified as drivable area. The identified and segmented drivable area is then used by the vehicle system to define boundaries for any desired autonomous driving path.

Accordingly, the disclosed example system provides for the detection of free drivable space without extensive training or complex algorithms. Moreover, the disclosed free space system enables a user to correct and improve estimates of free space by selecting boundary lines.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A user assisted method of identifying a drivable area for semi- autonomous and/or autonomous vehicle operation, the method comprising:

displaying an area including a potential drivable area on a display device disposed within a vehicle;

receiving, by a processor via a user interface, an area identified by a vehicle operator, the identified area being in the displayed area;

defining, by the processor, at least one surface characteristic of the identified area as corresponding with a surface that is drivable;

wherein the at least one surface characteristic is defined responsive to the identified area being disposed within a closed shape in the displayed area on the display device; and generating, by a vehicle control system, a vehicle path for the vehicle based upon the at least one surface characteristic, and performing, by the vehicle control system, an autonomous of semi-autonomous vehicle operation using the generated vehicle path.

2. The method as recited in claim 1, wherein the display device is configured to display an outline of the area identified by the vehicle operator.

3. The method as recited in claim 2, further comprising generating, by the processor, the outline displayed responsive to the vehicle operator tracing the drivable area on the display device.

4. The method as recited in claim 1, wherein the surface characteristic comprises one of a surface texture or a surface color.

5. The method as recited in claim 1, further comprising detecting, by the processor, areas within the displayed area having the defined surface characteristic and identifying the drivable area to include the detected areas.

6. The method as recited in claim 1, further comprising storing, by the processor, the surface characteristic as an identified drivable surface.

7. The method as recited in claim 6, further comprising defining the drivable area as all portions of the displayed area including the stored surface characteristic.

8. The method as recited in claim 7, further comprising dynamically identifying drivable areas during vehicle operation based on at least one of the stored surface characteristics.

9. The method as recited in claim 1, wherein the displayed area is based on an image captured by a vehicle camera.

10. The method as recited in claim 1, wherein the displayed area comprises a top-view corresponding to a location of the vehicle.

11. A vehicle control system comprising:
a display device configured to display an image of an area proximate the vehicle including a potential drivable area; and
a controller comprising a processor configured to identify a drivable area in the displayed image for use during autonomous vehicle operation, the identification being responsive to a vehicle operator selecting, via a user interface, an area in the displayved area the processor being configured to define at least one surface characteristic of the selected area as corresponding with a surface of the drivable area responsive to the selected area being disposed within a closed shape in the displayed area, the processor being further configured to store the at least one surface characteristic as indicative of the surface of the drivable area, the processor being further configured to generate a vehicle path based on the at least one surface characteristic indicative of the surface of the drivable area, and the processor being further configured to perform an autonomous or semi-autonomous vehicle operation based upon the vehicle path.

12. The vehicle control system as recited in claim 11, wherein the display device is configured to provide for tracing, by the vehicle operator, of an outline of the drivable area on the display device as corresponding to the vehicle operator selecting.

13. The vehicle control system as recited in claim 11, wherein the controller processor is further configured to detect areas within the displayed area having the selected surface characteristic and identifying the drivable area to include the detected areas.

14. The vehicle control system as recited in claim 13, wherein the controller processor is further configured to store the surface characteristic as corresponding to an identified drivable surface and to detect as the drivable area as all areas including the stored surface characteristic.

15. The vehicle control system as recited in claim 11, wherein controller processor is further configured to display the area proximate the vehicle from the image captured by a vehicle camera or from a top-down view of an area corresponding to a location of the vehicle.

16. A non-transitory computer readable storage medium including instructions for operating a vehicle control system, the computer readable storage medium including:
instructions prompting a display device to display an image of an area including a potential drivable area;
instructions prompting a controller processor within the vehicle to receive identification of an area by a vehicle operator via a user interface, the identified area being part of the area of the displayed image;
instructions prompting the controller processor to define a surface characteristic of the identified area as corresponding with a surface that is drivable, wherein the surface characteristic of the identified area is defined responsive to the identified area being disposed within a closed shape in the displayed image; and
instructions prompting the controller processor to define path boundaries for the vehicle based upon the surface characteristic, and to perform an autonomous or semi-autonomous vehicle operation based on the defined path boundaries.

17. The non-transitory computer readable storage medium as recited in claim 16, further including instructions prompting the controller to identify the drivable area based on the surface characteristic.

* * * * *